United States Patent [19]

Scheurer et al.

[11] Patent Number: 4,897,231

[45] Date of Patent: Jan. 30, 1990

[54] ANODIZED ALUMINUM COATING

[75] Inventors: Robert S. Scheurer; Kendal Hancock, both of Wichita Falls, Tex.

[73] Assignee: Wellington Leisure Products, Inc., Madison, Ga.

[21] Appl. No.: 309,962

[22] Filed: Feb. 13, 1989

Related U.S. Application Data

[63] Continuation of Ser. No. 776,868, Sep. 17, 1985, abandoned.

[51] Int. Cl.$^4$ .............................................. B29C 67/00
[52] U.S. Cl. ............................. 264/46.7; 264/328.6; 264/DIG. 83; 204/38.3; 204/38.7; 427/388.4; 427/428; 428/425.8
[58] Field of Search ................... 264/46.4, 46.5, 46.6, 264/46.7, 328.6, DIG. 83; 204/38.3, 38.7; 427/388.4, 428; 428/425.8

[56] References Cited

U.S. PATENT DOCUMENTS

| | | | |
|---|---|---|---|
| 3,935,349 | 1/1976 | Terai et al. | 427/409 |
| 4,250,585 | 2/1986 | Theriault et al. | 264/46.7 X |
| 4,310,390 | 1/1982 | Bradley et al. | 427/409 X |
| 4,515,919 | 5/1985 | Bradley et al. | 524/591 |
| 4,634,563 | 1/1987 | Hancock | 264/46.7 |

OTHER PUBLICATIONS

Kirk–Othmer, *Encyclopedia of Chemical Technology*, Third Edition, vol. 6, Jul. 2, 1979, pp. 404–405.

*Primary Examiner*—Michael Lusignan
*Attorney, Agent, or Firm*—Dennis T. Griggs

[57] ABSTRACT

An anodized aluminum sheet is prepared by applying an aqueous polyurethane 40 percent dispersion coating with a threaded roller having 20-1/32 inch deep triangular threads per inch. The coating is heated by graduated heating from about 125 degrees F. to about 240 degrees F. for about 20 minutes until the material is set and non-tacky. Thereafter, without special storage or handling requirements, the coated side of the anodized aluminum is bonded in a mold under reaction injection molding pressure to a reaction injection molding material.

7 Claims, No Drawings

ANODIZED ALUMINUM COATING

This is a continuation of co-pending application Ser. No. 06/776,868 filed on 09/17/85 now abandoned.

BACKGROUND OF THE INVENTION

This invention relates to the promotion of adhesion of an anodized aluminum surface to reaction injection molded material.

It is well known that anodized aluminum has an excellent resistance to oxidization. The anodized surface is a highly desireable surface, but the inability of that surface to stick to other materials makes it impractical to use anodized aluminum when bonding or otherwise adhering the aluminum to another material.

One process developed by Boeing allows plastic materials to adhere to aluminum structures, but that Boeing process starts with non-anodized aluminum and is a relatively expensive, multiple-step process. That process requires physically preparing a sheet, contacting the sheet with a vapor, rinsing the sheet, oven drying the sheet, and applying a primer coating. Once the aluminum material is primed, it still must be protected from the elements. Moreover, pieces must be individually treated.

The prior art holds many problems which are overcome by the present invention.

SUMMARY OF THE INVENTION

An anodized aluminum sheet is prepared by applying an aqueous polyurethane 40 percent dispersion coating with a roller having 20-1/32 inch deep triangular grooves per inch. The coating is heated for about 20 minutes at temperatures graduated from 125 to 240 degrees F. until the material is set and non-tacky. Thereafter, without special storage or handling requirements, the coated side of the anodized aluminum is bonded in a mold under reaction injection molding pressure to a reaction injection molding material.

A preferred coating for anodized aluminum for promoting adhesion of reaction injected molding composition comprises an aqueous polyurethane dispersion evenly distributed over one surface of the anodized aluminum and cured thereon.

Preferably the disperson has about 40 percent solids and about 10 percent solvents and the balance water.

The preferred solvents comprise about 7 percent NMP and about 3 percent isopropanol.

Preferably, the coating is applied uniformly and is cured at from about 125 degrees F. to about 240 degrees F. for about 20 minutes.

The preferred coating is at least 2 mils thick.

Preferably, the coating is applied to the anodized aluminum with a roller having a circumferentially grooved surface.

A preferred roller has about 20 threads to an inch. The triangular form.

A preferred method of applying an adhesion coating on an anodized aluminum surface comprises rolling a coating on the surface with a roller having threads cut in the peripheral surface of the roller. Preferably, the coating is applied by a roller having about 20 triangule shaped grooves per inch, each about 1/32 of an inch deep.

The application method, especially when used with the preferred aqueous polyurethane dispersion coating material produces a coating with discernable minute parallel lines which disperse into an apparently flat coating before curing and which results in a flat, uniform coating at least 2 mils thick after curing.

The preferred method of curing of the adhesion coating on the anodized aluminum surface comprises first ensuring precision and uniformity of the coating and then heating the coating preferably with radiant heat and preferably in a conveyor oven for about 20 minutes at temperatures increasing from about 125 to 240 degrees F. Too short a time or too low a temperature results in a coating which is not fully cured and which is not satisfactory. Too long a time or too high a temperature burns the coating. Uniformity of the coating before it enters the oven is critical so that the coating is fully cured but is not baked or burned.

While it is possible to vary the temperature slightly, the most beneficial results of the present invention are achieved by precisely graduating the temperature from about 125 degrees F. to about 240 degrees F. While time of curing may be varied slightly, the most beneficial results of the present invention are achieved by exposing the coated surface to the oven temperature for the time precisely within an about 20 minute range. Preferably, the coated surface is heated in a conveyor oven by passing the surface through the oven at a uniform speed which is sufficient to keep the surface in the oven for about 20 minutes. The oven is heated with radiant heaters above the conveyor. The heaters are spaced and supplied so that temperature at the heated surface uniformly increases from about 125 degrees at the entrance of the furnace to about 240 degrees F. at the exit of the furnace.

It has been determined that other coating methods such as dipping, or brushing or distributing with a doctor blade or conventional roller do not provide repeatable uniformity of the surface coating which is necessary to carry out the present invention and to achieve the new and obvious results.

The present invention also provides a structure in which the highly desireable anodized aluminum may be used as one external surface of a reaction injected molded structure. Uniquely to the present invention the anodized aluminum surface after priming with the materials and steps of the present invention is secured to the reaction injected molded material during the molding process. No additional steps of pre-treating, adhesive coating or subjecting to increased pressures or any other steps are necessary. Anodized aluminum surfaces which are coated according to the present invention adhere to the reaction injection molded materials in a manner that makes separation from the materials impossible. Destructive tests show that forced separation of the anodized aluminum and the reaction injection molded material actually separates parts of the latter material and leaves reaction injection molded material adhered to the treated surface of the anodized aluminum.

Other objects and features of the invention are apparent in the disclosure which includes the above and on-going specification and claims.

DESCRIPTION OF A PREFERRED EMBODIMENT OF THE INVENTION

In a preferred embodiment of the invention, a coiled aluminum sheet is anodized using conventional methods. The anodized sheet is split into desired widths which are shipped and stored as coils which require no special handling or environmental considerations to protect the major surfaces against oxidation.

The coiled, anodized aluminum sheet is cut into desired lengths for concurrent use as reinforcements and decorative surfaces for reaction injection molded recreational products such as water skis and skateboards.

In a preferred embodiment, the sheets are decorated on first faces with decorative coatings, which are covered with protective removable laminates. Opposite, non-decorated faces of the anodized aluminum sheets are then coated with the preferred aqueous polyurethane dispersion as previously described in the manner previously described. The preferred coating results in a uniform rigid non-tacky laminate. That desired result is achieved by using, in the preferred embodiment, a product which has about 40 percent solids, about 10 solvents, and about 50 percent water. The solvents in the preferred product are 7 percent NMP and 3 percent isopropanol. One particularly suitable product is obtained from the Mobay Chemical Company, which designates the product as XW-114.

The product may be applied in any way which ensures uniformity of the resultant coating. In the preferred method, the coating is applied with a roller having a surface in which triangular grooves or, more preferably, triangular threads from about 1/64 to about 1/16 inch deep have been cut with about 10 to 30 and preferably about 20 threads per inch. The coating method produces fine even lines of coating material which lines tend to disappear and merge in a uniform surface before the anodized aluminum sheets enter an oven. Preferably, a conveyor oven is used. In the preferred embodiment, the speed of the conveyor is carefully controlled so that the coated anodized aluminum sheets are maintained at a uniformly increasing temperature of from about ambient to about 275 degrees and preferably from about 125 degrees to about 240 degrees F. for from about 5 to about 30 and preferably about 20 minutes. The coatings on the sheets leaving the oven are fully cured and are non-tacky. The coatings will not pick up particulate material, and the sheets may be stacked until used. The sheets are then placed in molds. The molds are closed and polyurethane rigid foaming materials are injected into the molds. The materials expand, and the foam tightly presses the laminate-protected decorated surface of the aluminum sheet against the mold surface and tightly presses the polyurethane foam against the coated surface of the sheets under the high molding pressures, forming a permanent bond between the rigid polyurethane foam and the coated surface of the anodized aluminum sheet. The final rigid product is removed from the mold and the aluminum sheet is trimmed as necessary. A tight bond between the decorative reinforcing aluminum sheet and the reaction injection molded body results.

In one example, one side of an anodized aluminum sheet is coated with the dispersion as previously described and is heated in a preheated oven at about 225 degrees for about 10 minutes. In a second example, a coated anodized sheet is placed in a cold oven, which is then heated to 225 degrees F. for from 10 to 30 minutes. A superior product results. In a third embodiment, a threaded roller as described applies the dispersion to an anodized aluminum surface. The aluminum piece is immediately placed on a conveyor which carries the piece through an oven. Initial surface temperature upon entering the oven is about 125 degrees F. The surface temperature is uniformly increased in the oven until it reaches from about 215 to about 240 degrees F. at the oven exit. A better product results.

In one preferred embodiment, a conveyor is set at a speed required to move products through an oven in 22 minutes past three heater sections. The first section has a thermostat set at 125 degrees and heats the coating from ambient temperature to about 115-135 degrees F. in about seven minutes. The second bank of heaters is set at 225 degrees F. and heats the coated sheets from about 125 degrees F. at the beginning to about 210 degrees F. to 240 degrees F. at the end of the second section over a period of about seven minutes. A thermostat in the third section is set at about 225 degrees F. and holds the oven temperature at about 215 to 240 degrees F. for the last seven or eight minutes. The most desireable coating results.

While the invention has been described with reference to a specific embodiment, modifications and variations of the invention may be constructed without departing from the scope of the invention. The scope of the invention is defined in the following claims.

We claim:

1. The method of bonding a body of reaction injection molding material onto a metal substrate comprising the steps:
   applying a coating of aqueous polymer dispersion material onto a surface of said substrate under ambient temperature conditions;
   heating said coated substrate at an elevated temperature to yield a cured, solid residue which is set and non-tacky; and,
   contacting the cured coating of said substrate with a body of reaction injection molding material in a mold under reaction injection molding pressure.

2. The method as defined in claim 1, including the step of applying said polymer dispersion coating onto said substrate surface in multiple strips which extend substantially along parallel lines.

3. The method as defined in claim 2, including the step of permitting the aqueous polymer dispersion material in said strips to disperse into an apparently flat coating before performing said heating step.

4. The method as defined in claim 2, wherein said coating is applied onto said substrate surface in strips having a depth of about 1/32 of an inch, with said strips being applied in a surface density of about 20 strips per inch.

5. The method as defined in claim 1, wherein the heating step is performed in a plurality of heating stages by increasing the heating temperature from an initial temperature of about 125° F. in a first heating stage to a final temperature of about 240° F. in a final heating stage.

6. The method as defined in claim 1, wherein said aqueous polymer dispersion material includes a polymer component, a volatile solvent component and water, wherein the polymer component constitutes about 40% by weight of said material, said volatile solvent component constitutes about 10% by weight of said material and the water component constitutes substantially the balance, wherein said heating step is performed until the water component and volatile solvent component have been substantially vaporized.

7. The method as defined in claim 1, wherein said substrate comprises anodized aluminum and said polymer dispersion material comprises polyurethane.

* * * * *

UNITED STATES PATENT AND TRADEMARK OFFICE
CERTIFICATE OF CORRECTION

PATENT NO. : 4,897,231

DATED : 01/30/90

INVENTOR(S) : Robert S. Scheurer; Kendal Hancock

It is certified that error appears in the above-identified patent and that said Letters Patent is hereby corrected as shown below:

Column 1, line 58, "triangular form." should be -- threads are about 1/32 of an inch deep, and the threads have a triangular form. --.

Signed and Sealed this

Eighth Day of January, 1991

Attest:

HARRY F. MANBECK, JR.

*Attesting Officer*

*Commissioner of Patents and Trademarks*